(12) United States Patent
Hondo

(10) Patent No.: US 9,477,442 B2
(45) Date of Patent: Oct. 25, 2016

(54) PROCESSOR AND CONTROL METHOD OF PROCESSOR

(71) Applicant: FUJITSU LIMITED, Kawasaki-shi, Kanagawa (JP)

(72) Inventor: Mikio Hondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 14/479,392

(22) Filed: Sep. 8, 2014

(65) Prior Publication Data

US 2014/0379772 A1    Dec. 25, 2014

Related U.S. Application Data

(63) Continuation of application No. PCT/JP2012/058646, filed on Mar. 30, 2012.

(51) Int. Cl.
*G06F 7/483* (2006.01)
*G06F 1/03* (2006.01)
*G06F 7/556* (2006.01)

(52) U.S. Cl.
CPC ............... *G06F 7/556* (2013.01); *G06F 7/483* (2013.01); *G06F 2207/483* (2013.01); *G06F 2207/556* (2013.01)

(58) Field of Classification Search
CPC ..................................................... G06F 7/556
See application file for complete search history.

(56) References Cited

U.S. PATENT DOCUMENTS

| 2002/0087608 | A1 | 7/2002 | Rarick |
|---|---|---|---|
| 2004/0010532 | A1 | 1/2004 | Lu |
| 2005/0071401 | A1* | 3/2005 | Clifton ................. G06F 1/0356 708/290 |
| 2008/0228846 | A1 | 9/2008 | Hondou et al. |
| 2010/0198894 | A1 | 8/2010 | Azadet et al. |
| 2010/0332573 | A1 | 12/2010 | Hondou |

FOREIGN PATENT DOCUMENTS

| JP | 11-259675 | 9/1999 |
|---|---|---|
| JP | 2000-099493 | 4/2000 |

(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2012/058646, 7 pages, dated Oct. 9, 2014.

(Continued)

*Primary Examiner* — Andrew Caldwell
*Assistant Examiner* — Calvin M Brien
(74) *Attorney, Agent, or Firm* — Fujitsu Patent Center

(57) ABSTRACT

A processor includes: an exponent generating unit that generates an exponent part of a coefficient represented by a floating point number format based on a first part of received input data, the coefficient being obtained when an exponential function is decomposed into a series operation and the coefficient for the series operation; a storage unit that stores a mantissa part of the coefficient; a constant generating unit that reads constant data corresponding to a second part of the input data from the storage unit; and a selecting unit that selects and outputs the constant data from the constant generating unit when an instruction to be executed is a coefficient calculation instruction for calculation of the coefficient of the exponential function.

6 Claims, 3 Drawing Sheets

(56) References Cited

FOREIGN PATENT DOCUMENTS

JP    2008-234076    10/2008
JP    2011-013728    1/2011

OTHER PUBLICATIONS

Extended European Search Report dated Feb. 17, 2015 for corresponding European Patent Application No. 12872640.3, 6 pages.
Tang, P. T. P., "Table-Driven Implementation of the Exponential Function in IEEE Floating-Point Arithmetic", ACM Transactions on Mathematical Software, vol. 15, No. 2, Jun. 1, 1989, pp. 144-157, XP055152038.
Jamro, E. et al,"FPGA Implementation of 64-Bit Exponential Function for HPC", Field Programmable Logic and Applications, Internation AL Conference on, IEEE, PI, Aug. 1, 2007, pp. 718-721, XP031159175.

Bui, H. T. et al.,"Design and Synthesis of an IEEE-754 Exponential Function", Electrical and Computer Engineering, IEEE Canadian Conference on Edmonton, Alta., Canada, Piscataway NJ, USA, IEEE, US, vol. 1, May 9, 1999, pp. 450-455, XP010359752.
"Japanese Office Action" mailed by JPO and corresponding to Japanese application No. 2014-507237 on May 19, 2015, with partial English translation (4 pages).
Tang Ping, "Table-Driven Implementation of the Exponential Function in IEEE Floating-Point Arithmetic", ACM Transactions on Mathematical Software, vol. 15, No. 2, Jun. 1989, pp. 144-157 (14 pages).
Gao, Jianbo et al, "The Design and Implementation of Exponential Operation Based on AltiVec", Microelectronics & Computer, vol. 27, No. 9, pp. 176-180, Sep. 2010, cited in CNOA mailed on May 26, 2016 for corresponding Chinese Application No. 201280071614.8 and English Abstract.
Chinese Office Action dated May 26, 2016 for corresponding Chinese Patent Application No. 201280071614.8, with English Translation, 20 pages.

* cited by examiner

F I G. 1
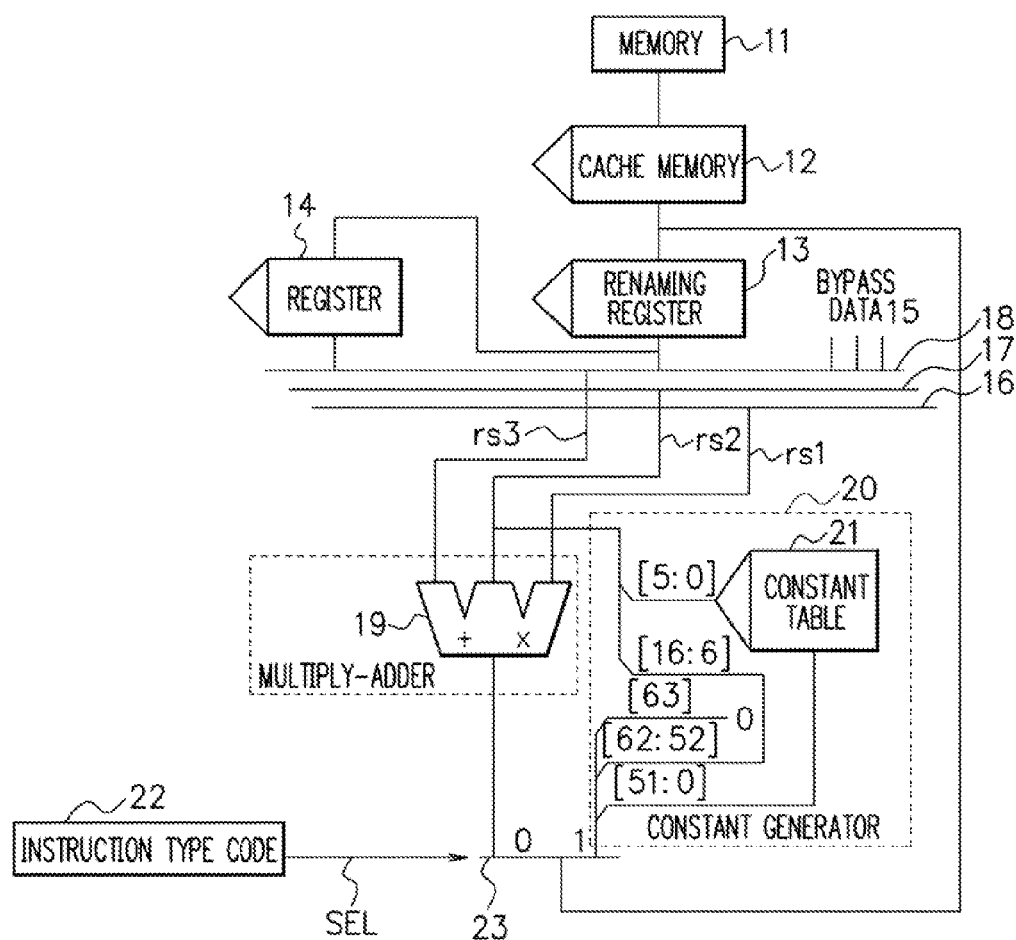

| i | 2**(i/64) | | |
|---|---|---|---|
| | s | e | f |
| 0 | 0 | bias | f0 |
| 1 | 0 | bias | f1 |
| | 0 | bias | f2 |
| ⋮ | ⋮ | | ⋮ |
| 63 | 0 | bias | f63 |
| | 63 62 | 52 51 | 0 |

PROCESSOR AND CONTROL METHOD OF PROCESSOR

CROSS-REFERENCE TO RELATED APPLICATION

This application is a continuation application of International Application PCT/JP2012/058646 filed on Mar. 30, 2012, and designated the U.S., the entire contents of which are incorporated herein by reference.

FIELD

The present invention relates to a processor and a control method of a processor.

BACKGROUND

A processor such as a CPU (Central Processing Unit) which performs an arithmetic operation of a mathematical function generally uses a Taylor series operation when performing the arithmetic operation of an exponential function. In the arithmetic operation of the exponential function, in order to obtain sufficient precision when the Taylor series operation is truncated at a finite degree, it is necessary to decompose the exponential function into the Taylor series operation that is an arithmetic operation of a Taylor series converging in precision given at the finite degree and a coefficient.

In a conventional art, calculation processing of the coefficient before the execution of the Taylor series operation in the arithmetic operation of the exponential function is implemented by software, uses the combination of a plurality of sets of conventional instructions, and involves many data transfers between a floating-point register and an integer register and arithmetic processing using an integer arithmetic unit such as a bit operation and a shift operation. Therefore, processing the entire arithmetic operation of the exponential function requires many instructions, which deteriorates performance such as affecting instruction issuance throughput.

There has been proposed a processor capable of executing the Taylor series operation at a high speed by storing, in a dedicated memory, a set of coefficient tables storing coefficient data of a Taylor series operation of a mathematical function and reading the coefficient data necessary for the Taylor series operation directly from the coefficient table to supply the read coefficient data to a floating point product-sum arithmetic unit (for example, refer to Patent Literature 1). There has also been proposed a processor having dedicated trigonometric function operation auxiliary instructions as instructions for the execution of the decision of a Taylor series expansion function and the calculation processing of an input argument to the expansion function which are performed before the execution of a Taylor series operation of a trigonometric function (for example, refer to Patent Literature 2).

Patent Literature 1: Japanese Laid-open Patent Publication No. 2008-234076
Patent Literature 2: Japanese Laid-open Patent Publication No. 2011-13728

SUMMARY

One embodiment of a processor includes: an exponent generating unit that generates an exponent part of a coefficient represented by a floating point number format based on a first part of received input data, the coefficient being obtained when an exponential function is decomposed into a series operation and the coefficient for the series operation; a storage unit that stores a mantissa part of the coefficient; a constant generating unit that reads constant data corresponding to a second part of the input data from the storage unit; and a selecting unit that selects and outputs the constant data from the constant generating unit when an instruction to be executed is a coefficient calculation instruction for calculation of the coefficient of the exponential function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of a processor according to an embodiment of the present invention;

DESCRIPTION OF EMBODIMENTS

Figures 2, 3:
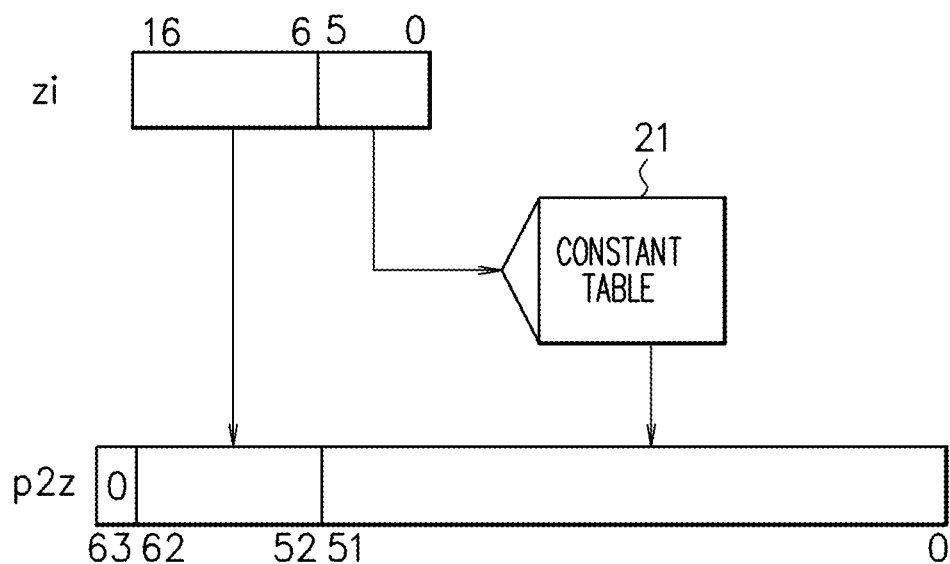
FIG. 2 is a chart illustrating an example of a constant table.
FIG. 3 is an explanatory chart of coefficient calculation processing in this embodiment.

Hereinafter, an embodiment of the present invention will be described on the basis of the drawings.

FIG. 1 is a diagram illustrating a configuration example of a processor according to one embodiment of the present invention, connected to a memory (main memory) as a main storage. The processor according to this embodiment includes a cache memory 12 which is connected to a memory (main memory) 11 provided outside the processor and which stores part of data of the main memory 11, a renaming register 13, a register file 14, and bypass data 15. The processor according to this embodiment further includes multiplexers 16 to 18, 23, a first arithmetic unit 19, and a second arithmetic unit 20. Further, an information processing apparatus at least includes the processor and the memory 11.

The register file 14 includes all registers which are used when the arithmetic units 19, 20 execute arithmetic operations. The renaming register 13 is provided for cancelling reversed dependency and output dependency of operand data. The bypass data 15 is data (operation result data) used in bypassing for solving a data hazard in an instruction pipeline of the processor. A register value stored in an entry of the renaming register 13 is transferred to the register file 14 at the time of retire.

The multiplexer 16 receives three kinds of operand data, that is, data output from the register file 14, data output from the renaming register 13, and the bypass data 15. The multiplexer 16 selects one operand data out of the three kinds of operand data to output the selected operand data as source data rs1. The multiplexers 17, 18 receive the three kinds of operand data similarly to the multiplexer 16 and output the selected operand data as source data rs2, rs3.

The first arithmetic unit 19 is a floating point product-sum arithmetic unit, and by using the source data rs1, rs2, rs3 input from the multiplexers 16, 17, 18, performs a product-sum operation of adding a value of rs3 to a product of a value of rs1 and a value of rs2. For example, the first arithmetic unit 19 performs a Taylor series operation by performing the product-sum operation using the input source data rs1, rs2, rs3.

The second arithmetic unit 20 is an arithmetic unit which performs arithmetic processing relating to an exponential function operation auxiliary instruction (fexpad). The second arithmetic unit 20 performs coefficient calculation processing for finding a coefficient obtained when an exponential function is decomposed into the Taylor series operation and the coefficient for the Taylor series operation, by using the source data rs2 input from the multiplexer 17. Note that the Taylor series operation obtained when the exponential function is decomposed into the Taylor series operation and the coefficient is performed in the first arithmetic unit 19, for instance. Further, in this embodiment, the second arithmetic unit 20 performs the coefficient calculation processing by using the source data rs2, but this is an example. The second arithmetic unit 20 may perform the coefficient calculation processing by using the source data rs1, or may perform the coefficient calculation processing by using the source data rs3.

The exponential function operation auxiliary instruction (fexpad) is an instruction for the execution of an arithmetic operation of {1'b0, sdat[16:6], Texp [sdat[5:0]][51:0]}, where sdat is the input source data. {1'b0, sdat[16:6], Texp[sdat[5:0]][51::0]} is in conformity with a data format of a double-precision floating point number of IEEE754. Specifically, the 63rd bit being a sign part (sign bit) is "0", and the 62nd to 52nd bits being an exponent part (exponent bits) are the 16th bit to the 6th bit of the source data sdat. Further, the 51st bit to the 0th bit being a mantissa part (mantissa part bits) are the 51st bit to the 0th bit of data which is taken from the constant table Texp based on an index indicated by the 5th bit to the 0th bit of the source data sdat.

The constant table Texp is provided as a constant table 21 that the second arithmetic unit 20 has. As illustrated in FIG. 2, the constant table Texp is a constant table with 64 entries storing values of (2(i/64)) according to the data format of the double-precision floating point number of IEEE754. Note that "" represents exponentiation, and i is an integer from 0 to 63. Here, when i=0 to 63, 1≤(2(i/64))<2, and therefore, as illustrated in FIG. 2, the sign part s and the exponent part e which are obtained when the value of (2(i/64)) is represented according to the data format of the double-precision floating point number of IEEE754 do not change irrespective of the value of i. Therefore, the constant table Texp only needs to store at least a value fi of the mantissa part f of the value of (2(i/64)). By storing only the mantissa part instead of all the values of (2(i/64)), it is possible to reduce a required memory capacity of the constant table Texp.

An instruction type code 22 is input as a selection signal SEL to the multiplexer 23. The multiplexer 23 outputs either an output of the first arithmetic unit 19 or an output of the second arithmetic unit 20 according to the selection signal SEL. In this embodiment, when the instruction type code is the exponential function operation auxiliary instruction (fexpad), a value of the selection signal SEL is set to "1" and based on this, the multiplexer 23 selects and outputs the output of the second arithmetic unit 20. On the other hand, when the instruction type code is not the exponential function operation auxiliary instruction (fexpad), the value of the selection signal SEL is set to "0" and based on this, the multiplexer 23 selects and outputs the output of the first arithmetic unit 19.

Hereinafter, the coefficient calculation processing by the second arithmetic unit 20 will be described.

Note that, in the description below, "**" represents the exponentiation, "!" represents a factorial, and "*" represents multiplication. Further, "log2( )" represents a logarithm of a base 2, and "log( )" represents a logarithm of a base e (Napier's constant).

The result of the Taylor series expansion of an exponential function exp(x) is expressed by Σ(1/n!)*x**n. In order to obtain sufficient precision when n is truncated at a finite degree, x may be x<1.

When the exponential function exp(x) is decomposed into the Taylor series operation and the coefficient for the Taylor series operation, the following is obtained.

exp (x)
=(2log2(e))x
=(2(1/log(2)))x
=2**(x/log(2))
=2**(y+z)
=(2**y)*(2**z)
=exp(log(2**y))*(2**z)
=exp(y*log(2))*(2**z)
=exp (y2) * (2**z)

In the above expression, y is a value whose absolute value is smaller than (1/64), and (y+z)=x/log(2). Therefore, z is a value equal to x/log(2) rounded by (1/64). Further, y2=y*log(2)=x−z*log(2).

Here, (absolute value of y2)<(log(2)/64)<1. Therefore, since sufficient precision is obtained for exp(y2) at a finite degree, it is calculated by the Taylor series operation, and (2z) is calculated as the coefficient. That is, in the arithmetic operation of the exponential function exp(x), exp(y2) is calculated by the Taylor series operation by the first arithmetic unit 19, and (2z) is calculated by the coefficient calculation processing by the second arithmetic unit 20.

Since z is the value equal to x/log(2) rounded by (1/64) as described above, z is expressed by z=p+q/64, where p is a natural number equal to 1 or more and q is an integer from 0 to 63, and therefore, 2z=2(p+q/64)=(2**p)*(2(q/64)). When this is compared with a value (−1)s*2**(e−bias)*(1. f) represented by the sign part s, the exponent part e, and the mantissa part f in the data format of the double-precision floating point number of IEEE754, s=0, e=p+bias, and (1. f)=2**(q/64). bias is a bias value in the data format of the double-precision floating point number of IEEE754.

Further, it is set that zi=int(x/log(2)*64+bias*64 +0.5). In the above expression, int(x) represents a value obtained when the value x is rounded down to an integer. Then, when this zi and z*64=p*64+q are compared, a value when the 5th bit to the 0th bit of zi are extracted and represented corresponds to a value of q, and a value when the 6th and larger bits of zi are extracted and represented corresponds to a value of p+ bias.

Therefore, by storing, in the constant table Texp, the mantissa part in the representation of the value of (2(i/64)) according to the data format of the double-precision floating point number of IEEE754 and taking out data based on the index indicated by zi[5:0], the mantissa part of the coefficient 2z is obtained. Therefore, the coefficient 2**z can be calculated by the arithmetic operation of {1'b0, sdat[16:6], Texp[sdat[5:0]][51:0]}.

Here, an assembler instruction sequence when the coefficient 2**z is calculated by, for example, coefficient calculation processing using conventional instructions will be given below. It is assumed that the aforesaid zi has already been calculated and stored in the floating-point register.

| | |
|---|---|
| stdf | zi, [ ] . . . (instruction C1) |
| ldx | [ ], zii . . . (instruction C2) |
| and | zii, 63, Texpe . . . (instruction C3) |
| sllx | Texpe, 3, Texpo . . . (instruction C4) |
| ldx | [Texpb + Texpo], p2zi . . . (instruction C5) |
| mov | 2047, p2zmm . . . (instruction C6) |
| sllx | p2zmm, 6, p2zmm . . . (instruction C7) |
| and | zii, p2zmm, p2zm . . . (instruction C8) |
| sllx | p2zm, 46, p2zm . . . (instruction C9) |
| or | p2zi, p2zm, p2zi . . . (instruction C10) |
| stdx | p2zi, [ ] . . . (instruction C11) |
| lddf | [ ], p2z . . . (instruction C12) |

By the instruction C1, zi is loaded from the floating-point register to the memory, and by the instruction C2, zi loaded to the memory is registered as zii in the integer register. By the instruction C3, a logical product operation of a value of zii and a value 63 is performed bit by bit and the operation result is substituted in Texpe. By the instruction C4, Texpe is shifted to a 3-bit higher-order side, and the result is substituted in Texpo. This processing is performed because an address needs to be indicated at an 8-byte interval when the table is referred to. Next, by the instruction C5, the table is referred to by using an address obtained by the addition of a base address Texpb on the memory where the table is stored and Texpo, and the data loaded from the table is substituted in p2zi. By the instruction C6, a value 2047 is substituted in p2zmm. In other words, mask data corresponding to 11 bits are created and substituted in p2zmm. By the instruction C7, p2zmm is shifted to a 6-bit higher-order side. By the instruction C8, a logical product operation of zii and p2zmm is performed bit by bit and the operation result is substituted in p2zm, and by the instruction C9, p2zm is shifted to a 46-bit higher-order side, so that the exponent part of the coefficient is obtained. Next, by the instruction C10, a logical sum operation of the obtained exponent part of the coefficient and p2zi being the data loaded from the table is performed bit by bit and the operation result is substituted in p2zi. Consequently, a value of the coefficient $2^{}z$ for the Taylor series operation is obtained. Then, by the instruction C11, p2zi is loaded from the integer register to the memory, and by the instruction C12, p2zi loaded to the memory is registered as p2z in the floating-point register, and here the coefficient calculation processing of the coefficient $2^{}z$ for the Taylor series operation is finished. Thus, when the coefficient $2^{**}z$ for the Taylor series operation is calculated by the coefficient calculation processing using the conventional instructions, the twelve instructions need to be executed and the processing is also complicated.

On the other hand, an assembler instruction sequence when the coefficient $2^{**}z$ for the Taylor series operation is calculated by the coefficient calculation processing using the exponential function operation auxiliary instruction (fexpad) in this embodiment will be given below.

fexpad zi, p2z . . . (instruction I1)

By executing the instruction I1, the coefficient calculation processing of the coefficient $2^{}z$ for the Taylor series operation is performed in the second arithmetic unit 20 by connecting bits so that p2z[63] becomes "0", p2z[62:52] becomes zi[16:6], and p2z[51:0] becomes data (the mantissa part of $2^{}(i/64)$) output from the constant table 21 according to zi[5:0], as illustrated in FIG. 3. In this manner, in this embodiment, with the single exponential function operation auxiliary instruction (fexpad), it is possible to perform the calculation processing of the coefficient for the Taylor series operation, and therefore, it is possible to cut eleven assembler instructions as compared with the conventional case.

As described above, according to this embodiment, with the single instruction, it is possible to perform the calculation processing of the coefficient for the Taylor series operation in the exponential function operation, which enables the high-speed arithmetic operation of the exponential function. Therefore, it is possible to improve instruction throughput in the processor to improve its performance. Further, in the configuration illustrated in FIG. 1, circuits that are newly provided in an ordinary processor in order to execute the arithmetic operation by the exponential function operation auxiliary instruction (fexpad) are the second arithmetic unit 20 and the multiplexer 23 Therefore, only by adding a small number of circuits, it is possible to speed up the calculation processing of the coefficient obtained when the exponential function is decomposed into the Taylor series operation and the coefficient for the Taylor series operation and speed up the arithmetic operation of the exponential function.

According to this embodiment, arithmetic performance of the calculation processing of the coefficient obtained when the exponential function is decomposed into the Taylor series operation and the coefficient for the Taylor series operation is improved ninefold (in a case where there are two pipelines by the integer arithmetic unit and two pipelines by the floating point arithmetic unit). Further, in the conventional method, since it is necessary to execute a load/store instruction in referring to the table in the calculation processing of the coefficient for the Taylor series operation, there is a possibility that a cache miss occurs, and in such a case, in this embodiment, the arithmetic performance of the calculation processing of the coefficient for the Taylor series operation is improved ninefold or more.

Figure 4:
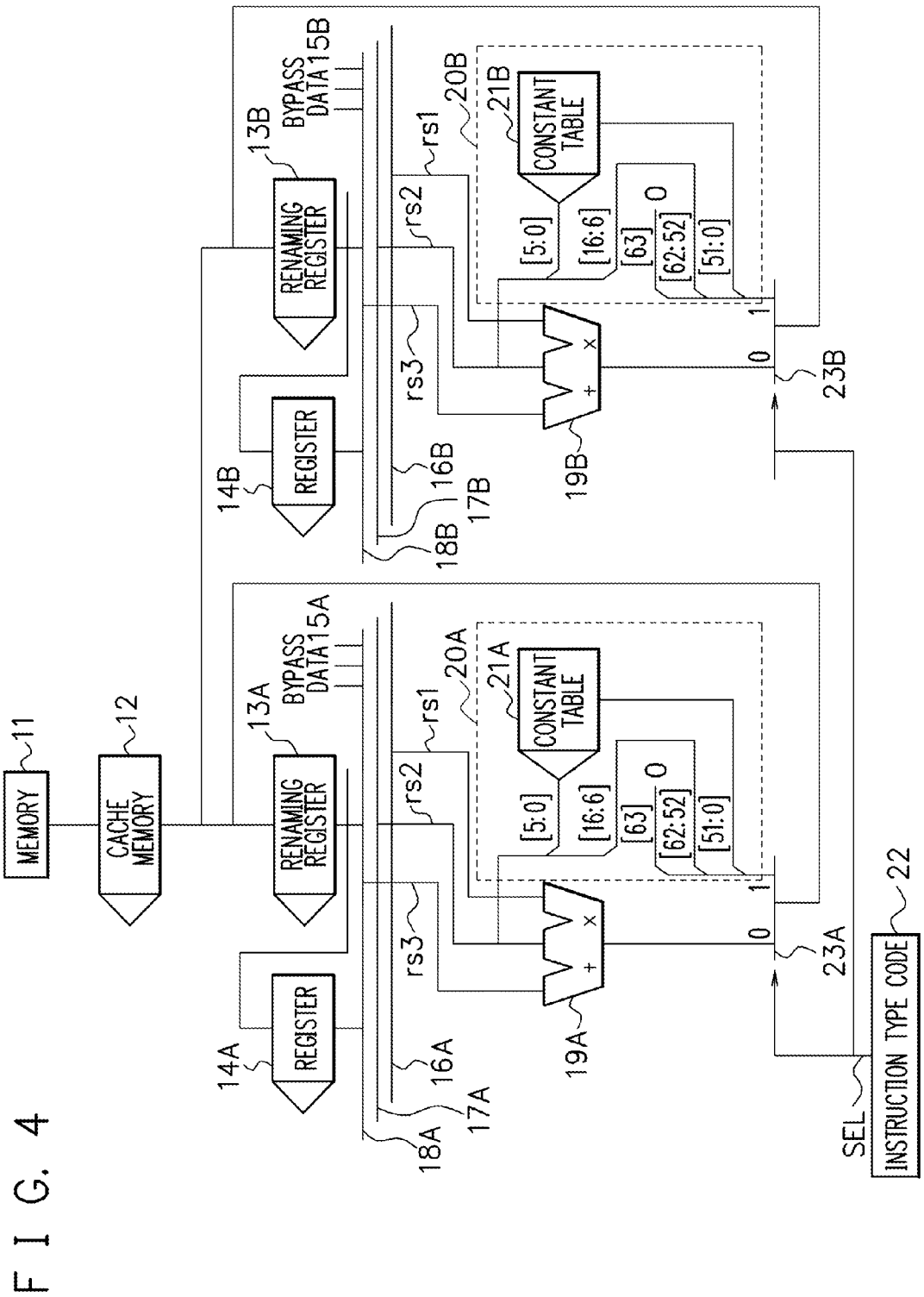
FIG. 4 is a diagram illustrating another configuration example of the processor according to this embodiment.

Note that the processor according to this embodiment is not limited to the configuration illustrated in FIG. 1, and the processor may be a processor of SIMD (Single Instruction stream-Multiple Data stream) type as illustrated in FIG. 4, for instance. FIG. 4 illustrates a 2SIMD processor as an example. As a first processing unit, it includes a renaming register 13A, a register file 14A, bypass data 15A, multiplexers 16A to 18A, 23A, a first arithmetic unit 19A, and a second arithmetic unit 20A. Further, as a second processing unit, it includes a renaming register 13B, a register file 14B, bypass data 15B, multiplexers 16B to 18B, 23B, a first arithmetic unit 19B, and a second arithmetic unit 20B. The processor is thus structured, and the first processing unit and the second processing unit execute the same arithmetic processing in parallel for two data with one instruction.

Incidentally, the 2SIMD processor is illustrated as an example in FIG. 4, but the structure such as 4SIMD or 8SIMD is also possible by further providing processing units.

Further, the above-described embodiments all present only concrete examples in carrying out the present invention, and the technical scope of the present invention should not be construed in a limited manner by these. That is, the present invention can be embodied in various forms without departing from its technical idea or its main features.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   an exponent generating unit that generates an exponent part of a coefficient represented by a floating point number format based on a first part of received input data, the coefficient being obtained when an exponential function is decomposed into a series operation and the coefficient for the series operation;
   a storage unit that stores a mantissa part of the coefficient;
   a constant generating unit that reads constant data corresponding to a second part of the input data from the storage unit; and
   a selecting unit that selects and outputs the constant data from the constant generating unit when an instruction to be executed is a coefficient calculation instruction for calculation of the coefficient of the exponential function.

2. The processor according to claim 1, wherein, as the constant data, the storage unit stores a mantissa part which is obtained when a value of $(2^{}(i/(2^{}$ a bit width of the second part$)))$ ($**$ represents exponentiation) is represented by the floating point number format, in correspondence with a value i (i is a natural number) indicated by the second part of the input data.

3. The processor according to claim 2, wherein the first part of the input data is an $(n+11)^{th}$ bit to an $(n+1)^{th}$ bit (n is a natural number) of the input data, and wherein the second part of the input data is an $n^{th}$ bit to a $0^{th}$ bit of the input data.

4. The processor according to claim 3, wherein the $(n+11)^{th}$ bit to the $(n+1)^{th}$ bit of the input data correspond to the exponent part of the coefficient represented by the floating point number format, and the $n^{th}$ bit to the $0^{th}$ bit of the input data correspond to the mantissa part of the coefficient represented by the floating point number format.

5. The processor according to claim 1, comprising a product-sum arithmetic unit that performs a product-sum operation using the input data,
   wherein, when the instruction to be executed is an instruction other than the coefficient calculation instruction, a product-sum operation result from the product-sum arithmetic unit that is a result of the product-sum operation using the input data is selected and output.

6. A control method of a processor, comprising:
   generating, by an exponent generating unit of the processor, an exponent part of a coefficient represented by a floating point number format based on a first part of received input data, the coefficient being obtained when an exponential function is decomposed into a series operation and the coefficient for the series operation;
   reading, by a constant generating unit of the processor, constant data corresponding to a second part of the input data from a storage unit that stores a mantissa part of the coefficient; and
   selecting and outputting, by a selecting unit of the processor, the constant data from the constant generating unit when an instruction to be executed is a coefficient calculation instruction for calculation of the coefficient of the exponential function.

* * * * *